United States Patent
Lee et al.

(10) Patent No.: US 8,819,102 B2
(45) Date of Patent: Aug. 26, 2014

(54) METHOD AND SYSTEM FOR MANAGING MESSAGE COMMUNICATIONS

(75) Inventors: David C. Lee, Sunnyvale, CA (US); Fadi R. Jabbour, Sunnyvale, CA (US); Eric H. Lee, San Jose, CA (US); Matthew R. Kuhlke, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1046 days.

(21) Appl. No.: 11/773,161

(22) Filed: Jul. 3, 2007

(65) Prior Publication Data

US 2009/0013046 A1    Jan. 8, 2009

(51) Int. Cl.
    *G06F 15/16* (2006.01)
(52) U.S. Cl.
    USPC .......................... 709/200; 709/204; 709/206
(58) Field of Classification Search
    USPC .......................................................... 709/200
    See application file for complete search history.

(56) References Cited

U.S. PATENT DOCUMENTS

| | | | | |
|---|---|---|---|---|
| 6,094,675 | A | 7/2000 | Sunaga et al. | 709/204 |
| 6,101,532 | A | 8/2000 | Horibe et al. | 709/206 |
| 6,480,885 | B1 * | 11/2002 | Olivier | 709/207 |
| 6,525,747 | B1 | 2/2003 | Bezos | 715/751 |
| 6,571,234 | B1 | 5/2003 | Knight et al. | 707/3 |
| 7,013,429 | B2 | 3/2006 | Fujimoto et al. | 715/752 |
| 7,139,804 | B2 * | 11/2006 | Bates et al. | 709/206 |
| 7,305,436 | B2 | 12/2007 | Willis | 709/204 |
| 7,487,216 | B2 * | 2/2009 | Miller et al. | 709/206 |
| 7,490,131 | B2 * | 2/2009 | Maller | 709/206 |
| 2002/0173319 | A1 * | 11/2002 | Fostick | 455/466 |
| 2004/0161080 | A1 * | 8/2004 | Digate et al. | 379/88.17 |
| 2005/0080852 | A1 * | 4/2005 | Kelley et al. | 709/206 |
| 2005/0165861 | A1 * | 7/2005 | Christie et al. | 707/201 |
| 2006/0101119 | A1 * | 5/2006 | Qureshi et al. | 709/206 |
| 2007/0016642 | A1 * | 1/2007 | Sapek | 709/206 |
| 2007/0124432 | A1 * | 5/2007 | Holtzman et al. | 709/219 |
| 2007/0136433 | A1 * | 6/2007 | Booton et al. | 709/213 |
| 2007/0185964 | A1 * | 8/2007 | Perlow et al. | 709/207 |
| 2007/0208614 | A1 * | 9/2007 | Arnett et al. | 705/10 |
| 2007/0214216 | A1 * | 9/2007 | Carrer et al. | 709/204 |
| 2007/0260681 | A1 * | 11/2007 | Jacovi et al. | 709/204 |
| 2008/0052324 | A1 * | 2/2008 | Choubey et al. | 707/201 |
| 2008/0168536 | A1 * | 7/2008 | Rueckwald | 726/4 |
| 2008/0172462 | A1 * | 7/2008 | Carrer et al. | 709/204 |
| 2008/0301250 | A1 * | 12/2008 | Hardy et al. | 709/207 |
| 2009/0037546 | A1 * | 2/2009 | Kirsch | 709/206 |
| 2009/0157819 | A1 * | 6/2009 | Hampton | 709/206 |
| 2009/0199103 | A1 * | 8/2009 | Brantley et al. | 715/733 |
| 2011/0153735 | A1 * | 6/2011 | Eisenberg | 709/203 |
| 2013/0124623 | A1 * | 5/2013 | Munter | 709/204 |

OTHER PUBLICATIONS

Denis Howe, "Definition of Forum at Dictionary.com—Computing Dictionary", Jan. 18, 1998, The Free On-line Dictionary of Computing.*

* cited by examiner

*Primary Examiner* — Thanh Tammy Nguyen
*Assistant Examiner* — Jonathan Bui
(74) *Attorney, Agent, or Firm* — Baker Botts L.L.P.

(57) ABSTRACT

A method for managing message communications includes detecting a message comprising a plurality of intended recipients and automatically initiating a forum for response communications associated with the message. The method also includes detecting response communications associated with the message and posting the response communications to the forum.

23 Claims, 3 Drawing Sheets

METHOD AND SYSTEM FOR MANAGING MESSAGE COMMUNICATIONS

TECHNICAL FIELD

This invention relates in general to communication systems and, more particularly, to a method and system for managing message communications.

BACKGROUND

E-mail, instant messaging and other similar communication methods have become increasingly more popular. Users rely on these methods to quickly communicate with large groups. Legitimate (non-spam) announcement messages sent to large distribution lists sometimes generate a number of responses that are not of interest to the majority of distribution list members. This problem is further compounded by many recipients responding with requests to be removed from the distribution list or requests to ask others to stop responding. These occurrences can create a mail storm that consumes disk space or computing resources in general and many people's time. However, these distribution lists cannot simply be eliminated, because they are desirable and needed to reach a large number of people. Some mail systems block access to large distribution lists through access control lists or require that such large distribution e-mails be sent thru a different system, such as through a web form. Some news clients support kill files that block offending users or topics. Blind carbon copies (BCCs) prevent responses but also hide the intended recipients.

BRIEF DESCRIPTION OF THE DRAWINGS

For a more complete understanding of various embodiments and their advantages, reference is now made to the following description, taken in conjunction with the accompanying drawings in which.

DETAILED DESCRIPTION

Overview

In accordance with a particular embodiment, a method for managing message communications includes detecting a message comprising a plurality of intended recipients and automatically initiating a forum for response communications associated with the message. The method also includes detecting response communications associated with the message and posting the response communications to the forum.

Description

Figure 1:
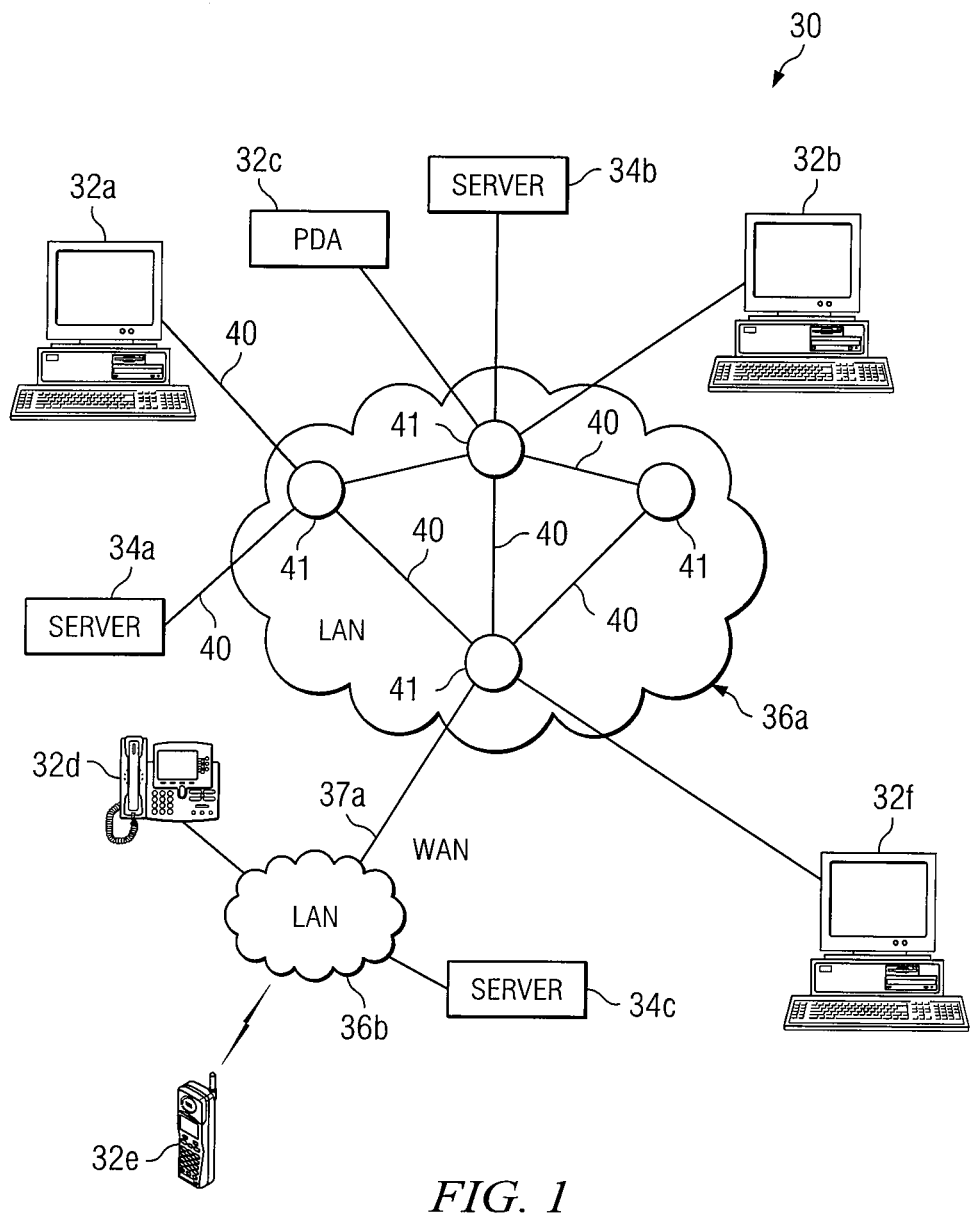
FIG. 1 is a simplified block diagram illustrating a communication system including a plurality of endpoints operable to communicate among each other and a plurality of servers, in accordance with a particular embodiment.

FIG. 1 illustrates a communication system 30 including a plurality of endpoints 32a-32f having the ability to establish communication sessions between each other and/or servers 34a-34c using one or more of communication networks 36a and 36b. Servers 34 may comprise e-mail servers, instant messaging servers, text messaging servers, internet servers or any other combination of hardware and/or software for facilitating communications and messages by and among endpoints 32. Such communications and messages may include any signal, data or message transmissions, whether including text, audio or video. Servers 34 may comprise hosted, non-hosted or outsourced servers. In accordance with particular embodiments, servers 34 may initiate forums for posting of response communications associated with messages, such as e-mails, SMS messages or instant messages. Thus, particular embodiments reduce the chance for mail storms of numerous e-mails while still facilitating discussion by providing for the redirection and/or posting of responses to web or other forums. This functionality may be implemented without the use of blind copies, and a separate interface is not necessarily required for the transmission of the original e-mail containing a plurality of recipients.

In the illustrated embodiment, communication network 36a is a local area network (LAN) that enables communication between a plurality of endpoints 32a-32f and servers 34a-34c distributed across multiple cities and geographic regions. Communication network 36b is another LAN, which couples endpoints 32d and 32e and server 34c with communication network 36a. Accordingly, users of endpoints 32a-32f and servers 34a-34c can establish communication sessions between and among each network component coupled for communication with one or more of networks 36a and 36b. Communication link 37a couples communication networks 36a and 36b. In the illustrated embodiment, communication link 37a.

Communication network 36a includes a plurality of segments 40 and nodes 41 that couple endpoints 32a, 32b, 32c and 32f with servers 34a and 34b and communication network 36b. Therefore, a user of endpoint 32a is provided with access to endpoints 32b-32f and servers 34a-34c. Segments 40 may include a broadband access link, digital subscriber (DSL) link, a T1 link, a fiber optic link, and/or a wireless link. Nodes 41 may include any combination of network components, gatekeepers, call managers, telephony servers, routers, hubs, switches, gateways, endpoints, or other hardware, software, or embedded logic implementing any number of communication protocols that allow for the exchange of packets in communication system 30. Communication network 36a may include any number and combination of segments 40, nodes 41.

Although the illustrated embodiment includes two communication networks 36a and 36b, the term "communication network" should be interpreted as generally defining any network capable of transmitting audio and/or video telecommunication signals, data and/or messages, including signals, data or messages transmitted through text chat, instant messaging and e-mail. Any one of networks 36a and 36b may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32f.

Communications over communication networks 36a and 36b may use any suitable communication protocol, such as IP. For example, using IP, each of the components coupled together by communication network 36a in communication system 30 may be identified in information directed using IP addresses. In this manner, networks 36a and 36b may support any form and/or combination of point-to-point, multicast, unicast, or other techniques for exchanging media packets among components in communication system 30. Thus, any network components capable of exchanging audio, video, or other data using frames or packets, are included within the scope of various embodiments.

Network 36a may be directly coupled to other IP networks including, but not limited to, another LAN or the Internet. In addition, communication network 36a may also be coupled to non-IP telecommunication networks through the use of interfaces or components, such as a gateway.

In particular embodiments, communication system 30 may receive and transmit data according to simple mail transfer protocol (SMTP). In some embodiments, communications may occur in a session initiation protocol (SIP) environment. SIP is an application-layer control protocol that includes primitives for establishing, modifying and terminating communication sessions. SIP works independently of underlying transport protocols and without dependency on the type of session that is being established. SIP may also transparently support name mapping and redirection services, which support personal mobility.

Endpoints 32a-32f may represent any suitable combination of hardware, software, and/or encoded logic to provide communication services to a user. For example, these endpoints may include a personal computer, an IP phone, a cell phone, a PDA any other communication hardware, software and/or encoded logic that supports the communication of packets of media (or frames) using communication network 36a. Endpoints 32a-32f may also include unattended or automated systems, gateways, other intermediate components, or other devices that can establish media sessions.

Servers 34 may comprise e-mail servers, instant messaging servers, text messaging servers, internet servers or combination thereof or any other combination of hardware, software and/or encoded logic for facilitating communications and messages by and among endpoints 32. Specific functionality of servers 34 is further discussed below with respect to server 100 of FIG. 2.

It will be recognized by those of ordinary skill in the art that endpoints 32a-32f, servers 34a-34c and other illustrated components may be any combination of hardware, software and/or encoded logic that provides communication services to a user. Although FIG. 1 illustrates a particular number and configuration of endpoints, servers, segments, nodes and links communication system 30 contemplates any number or arrangement of such components for communicating media.

Figure 2:
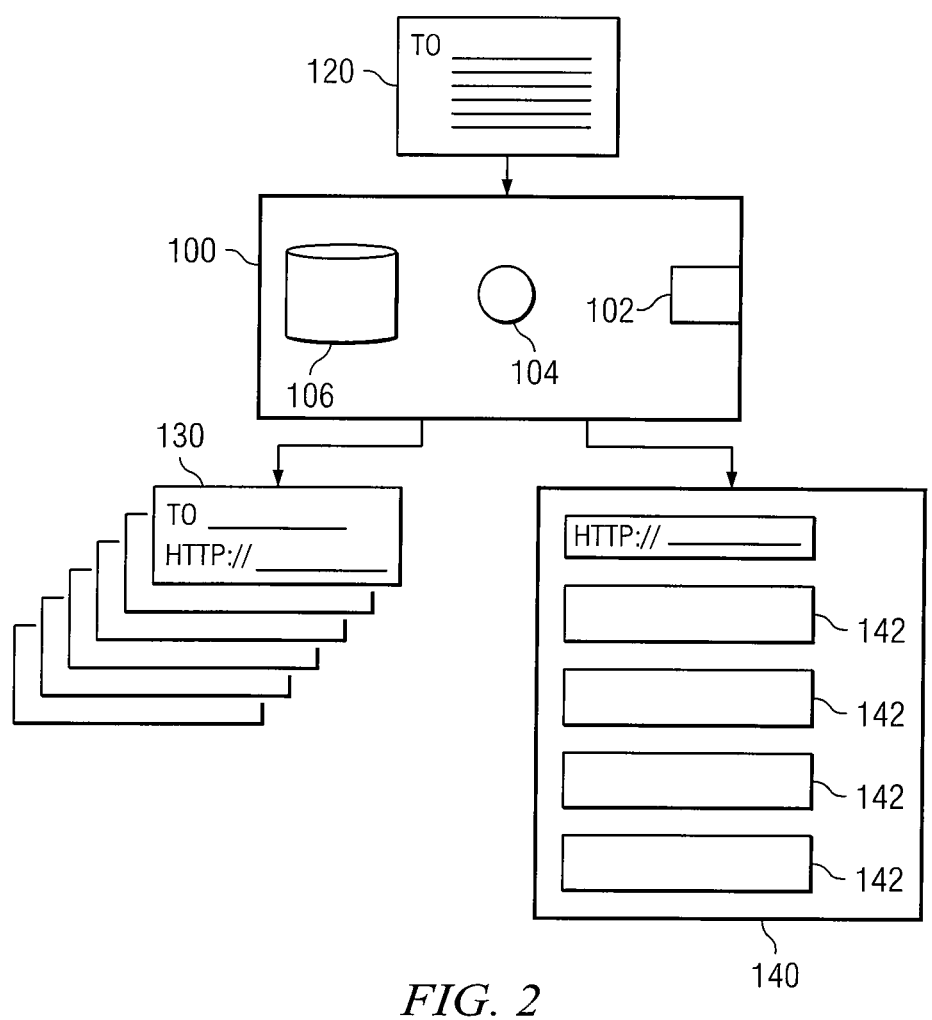
FIG. 2 is a simplified block diagram illustrating a server and system functionality, in accordance with a particular embodiment.

FIG. 2 illustrates a server 100 and system functionality, in accordance with a particular embodiment. Server 100 may be similar to servers 34 of FIG. 1 and may be coupled to a plurality of users through one or more communication networks, such as those illustrated and described in communication system 30 of FIG. 1. Server 100 includes an interface 102, a processor 104 and memory 106. Interface 102 couples server 100 with one or more communication networks.

Processor 104 may be a microprocessor, controller, or any other suitable computing device, resource, or combination of hardware, software and/or encoded logic operable to provide, either alone or in conjunction with other server components, functionality of server 100. Such functionality may include detection of messages and automatic use of, or redirection to, forums for response communications associated with the messages based on configured instructions. Memory 106 may be any form of volatile or non-volatile memory including, without limitation, magnetic media, optical media, random access memory (RAM), read-only memory (ROM), removable media, or any other suitable local or remote memory component. Memory 106 may store any suitable data or information, including software and encoded logic, utilized by server 100. For example, memory 106 may store instructions and/or URLs with respect to the initiation of forums for response communications associated with messages. Memory 106 may also store reply and response communications for posting to the forum.

As an example in operation, server 100 may be an e-mail server that facilitates the communication of e-mails among users. In this example, server 100 receives an e-mail 120 intended for a large distribution list of recipients. In some embodiments, an e-mail may not actually pass through the server but may otherwise be detected by the server to implement the functionality discussed herein. Server 100 may utilize any suitable threshold to determine whether a particular message includes a large number of recipients. In some cases, for example, five recipients may be considered a large number and in other cases there may need to be at least 100 recipients for it to be considered a large number.

In this embodiment, when e-mail 120 is transmitted to its intended recipients, processor 104 also directs those recipients to a URL of a web page set up for responses and/or discussion with respect to the original e-mail. Server 100 may send a plurality of messages 130, such as e-mails, instant messages and/or text messages, to each recipient directing them to the applicable URL for discussion. In some embodiments, messages 130 directing the recipients to the URL may be included with the delivery of the original e-mail 120.

When the recipients receive the message with the URL, they may use their web browser to visit web page 140 at the URL in order to discuss the subject matter of e-mail 120. Web page 140 may include a plurality of posts 142 with responses from various recipients of the e-mail. Web page 140 may be set up in any suitable format, such as a blog format with comments or a message board format with various threads. Thus, an internet server, whether included in functionality of server 100 or otherwise, may receive communications for web page 140 and may post those communications on the web page. This allows users to communicate messages in response to e-mail 120 that may be viewed by the entire distribution list of e-mail 120 without cluttering the mail boxes of recipients of the e-mail. Moreover, recipients who are not interested in viewing responses to the e-mail do not have to visit web page 140 with those responses and will not be distracted by other communications on the subject matter in their e-mail box or otherwise.

In some cases, processor 104 may not automatically set up web page 140 for discussion upon receipt or detection of e-mail 120 having a certain number of recipients. Instead, processor 104 may wait until a certain number of responses to e-mail 120 have been communicated (e.g., 1, 2 or 5 responses in some embodiments) before setting up the web page and directing recipients to its URL. In some embodiments, after web page 140 has been set up, processor 104 may automatically post any further e-mail responses to e-mail 120 to the web page. In some cases processor 104 may block these e-mail responses communicated after setting up of the web page from e-mail communication to their intended recipients (e.g., the original sender and recipients of e-mail 120). Thus, once web page 140 has been set up, processor 104 may block further e-mail responses.

In some embodiments, the determination of whether to set up a web page or other forum for discussion and posting of responses to an e-mail may be based on factors other than a number of recipients of a particular e-mail, For example, this functionality may be implemented for e-mails of a particular subject type or for e-mails going to particular mailing lists (regardless of the number of recipients). In some embodiments, it may be dynamically introduced based on criteria similar to SPAM filtering or it may be specified by an e-mail sender on a per e-mail basis. Particular embodiments contemplate any particular static or dynamic policy for implementing the discussion forum and/or web posting functionality for communications in response to e-mails.

As indicated above, particular embodiments may implement the functionality discussed herein with respect to any particular type of messages. Thus, while server 100 is discussed with respect to e-mail messages, other embodiments may implement similar functionality with respect to instant messages, SMS messages or any other type of messages. In addition, this functionality may be implemented with respect to audio and video messages and postings. For example, audio or video messages to large distribution groups may trigger the opening of a web page or other forum for posting of any response communications, including audio or video response communications.

While particular embodiments are discussed herein with respect to functionality provided at server 100, other embodiments may distribute functionality across a one or more communications networks, including at user endpoints such as endpoints 32 of FIG. 1. For example, endpoints 32 may automatically implement a user interface through which a user may respond to a particular message, and such response may be automatically posted to a web page or other forum for discussion. In some embodiments, users may respond to a particular message through a typical e-mail interface, and endpoints 32 may automatically redirect and/or post that response to a web site or other forum set up for discussion on the original message. Thus, functionality discussed herein may be provided through any suitable communication system component or components working together.

As discussed herein, particular embodiments reduce the chance for mail storms of numerous e-mails while still facilitating discussion by providing for the redirection and/or posting of responses to web or other forums. This functionality may be implemented without the use of blind carbon copies (BCCs), and a separate interface is not necessarily required for the transmission of the original e-mail containing a plurality of recipients.

Figure 3:
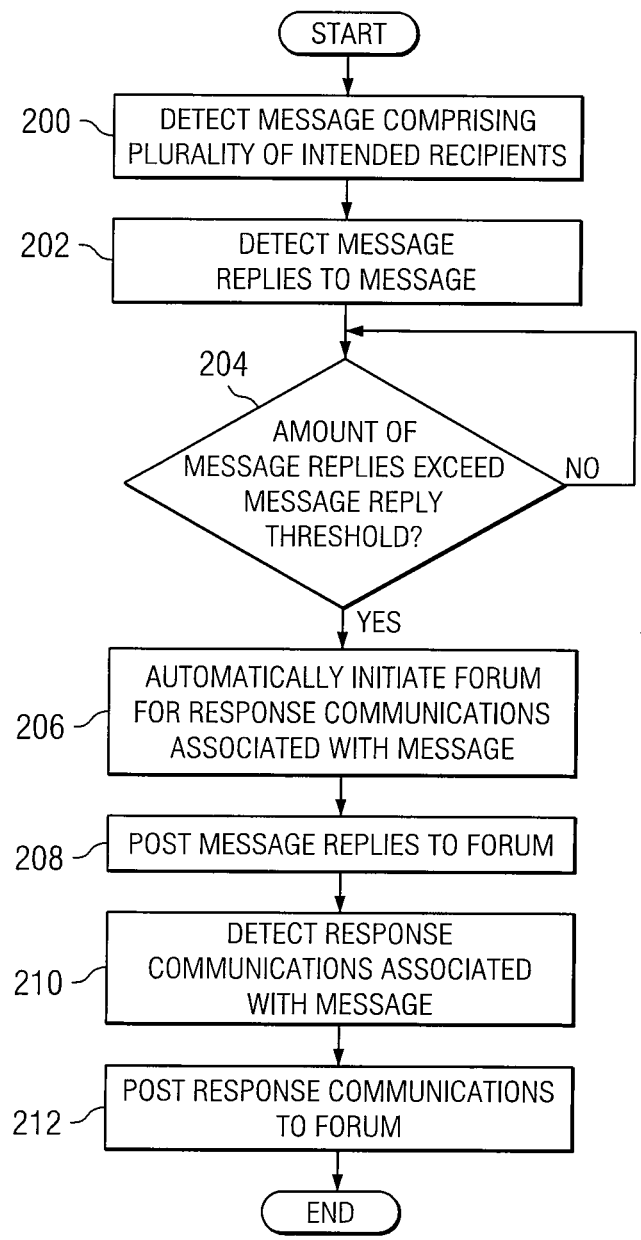
FIG. 3 is a flow chart illustrating a method for managing message communications, in accordance with a particular embodiment.

FIG. 3 is a flowchart illustrating a method for managing message communications, in accordance with a particular embodiment. The method begins at step 200 where a message comprising a plurality of intended recipients is detected. The message may be an e-mail, SMS, instant or other type of message comprising text, audio or video data. The message may be detected, for example, by being received by an e-mail or other server.

At step 202 message replies to the original message are detected. For example, e-mail replies from original recipients may be detected. These may include replies to be sent to the original e-mail sender and all other recipients. At step 204 it is determined whether the amount or number of message replies exceeds a particular threshold. The threshold may be set by an administrator, user or software developer according to any particular criteria. If the number of replies to the message has exceeded the threshold, then the method proceeds to step 206.

At step 206, a forum is automatically initiated for response communications associated with the message. The forum may be a web site forum, a blog or any other suitable forum. The forum may be set in particular embodiments by a server such as an internet server or an e-mail server. The forum may comprise an internet URL for access by recipients of the original message. At step 208, the previous message replies are posted to the forum. For example, e-mail replies sent before the forum was initiated may be posted to the forum by the server initiating the forum. In some cases such replies may not be posted since e-mail recipients may have already received them. As discussed above, in particular embodiments a forum may be initiated before any e-mail replies (e.g., based on a number of recipients in the distribution list of the original e-mail or on other factors).

At step 210, response communications associated with the message are detected and posted to the forum at step 212. These steps may include, for example, users such as recipients of the original e-mail visiting a URL of an initiated web forum for posting of response communications. These steps may also include detection of e-mail responses from those users and posting of such e-mail responses to the forum by a server. In some embodiments, e-mail responses communicated after the forum has been initiated may be blocked and/or redirected for posting to the forum.

One skilled in the art will readily recognize that some of the steps illustrated in FIG. 3 may be combined, modified or deleted where appropriate, and additional steps may also be added to the flowchart. Additionally, steps may be performed in any suitable order without departing from the scope of the invention.

Technical advantages of particular embodiments include the initiation of a forum for posting of response communications associated with a message, such as an e-mail, short message service (SMS) message or instant message. Accordingly, particular embodiments reduce the chance for mail storms of numerous e-mails while still facilitating discussion by providing for the redirection and/or posting of responses to web or other forums. This saves time and resources associated with communication of large numbers of messages.

Other technical advantages will be readily apparent to one skilled in the art from the following figures, descriptions, and claims. Moreover, while specific advantages have been enumerated above, various embodiments may include all, some or none of the enumerated advantages.

Although particular embodiments have been described in detail with reference to particular embodiments, it should be understood that various other changes, substitutions, and alterations may be made hereto without departing from the spirit and scope of various embodiments. For example, although particular embodiments have been described with reference to a number of elements included within communication system 30 and server 100, these elements may be combined, rearranged or positioned in order to accommodate particular routing architectures or needs. In addition, any of these elements may be provided as separate external components to communication system 30, server 100 or each other where appropriate. Particular embodiments contemplate great flexibility in the arrangement of these elements and their internal components and distribution of their functionality throughout communication system 30.

Numerous other changes, substitutions, variations, alterations and modifications may be ascertained by those skilled in the art and it is intended that various embodiments encompass all such changes, substitutions, variations, alterations and modifications as falling within the spirit and scope of the appended claims.

What is claimed is:

1. A method for managing message communications, comprising:
   receiving, by an interface coupled to a communications network, an electronic message;
   wherein the electronic message is associated with a first communication platform;
   detecting, by a processor, that the electronic message comprises a number of intended recipients;
   in response to detecting that the number of intended recipients is larger than a threshold, automatically initiating, by the processor, an electronic forum for response communications associated with the electronic message;
wherein the electronic forum is associated with a second communication platform and comprises an interface for intended recipients to asynchronously view the response communications associated with the electronic message;
detecting, by the processor, the response communications associated with the electronic message; and
posting, by the processor, the response communications to the electronic forum.

2. The method of claim 1, wherein the electronic message comprises an e-mail message.

3. A method for managing message communications, comprising:
receiving, by an interface coupled to a communications network, an electronic message;
wherein the electronic message is associated with a first communication platform;
detecting, by a processor, that the electronic message comprises a plurality of intended recipients;
automatically initiating, by the processor, an electronic forum for response communications associated with the electronic message;
wherein the electronic forum is associated with a second communication platform and comprises an interface for intended recipients to asynchronously view the response communications associated with the electronic message;
detecting, by the processor, the response communications associated with the electronic message;
posting, by the processor, the response communications to the electronic forum;
wherein automatically initiating an electronic forum for response communications associated with the electronic message further comprises:
detecting, by the processor, message replies to the electronic message, wherein the message replies are associated with the first communication platform;
determining, by the processor, that an amount of the message replies exceeds a message reply threshold; and
based on the determination that an amount of the message replies exceeds a message reply threshold, automatically initiating, by the processor, the electronic forum for response communications associated with the electronic message.

4. The method of claim 3, further comprising posting the message replies to the electronic forum.

5. The method of claim 1, wherein the electronic forum comprises a web page.

6. The method of claim 5, further comprising communicating an address of the web page to one or more of the intended recipients.

7. The method of claim 1, further comprising:
detecting message replies to the electronic message by the processor, the message replies comprising intended reply recipients;
blocking, by the processor, the message replies from communication to the intended reply recipients; and
posting, by the processor, the message replies to the electronic forum.

8. A computer implemented system for managing message communications, comprising:
an interface coupled to a communication network and operable to receive an electronic message;
wherein the electronic message is associated with a first communication platform; and
at least one processor coupled to the interface and operable to:
detect that the electronic message comprises a number of intended recipients;
in response to detecting that the number of intended recipients is larger than a threshold, automatically initiate an electronic forum for response communications associated with the electronic message;
wherein the electronic forum is associated with a second communication platform and comprises an interface for intended recipients to asynchronously view the response communications associated with the electronic message;
detect the response communications associated with the electronic message; and
post the response communications to the electronic forum.

9. The system of claim 8, wherein the electronic message comprises an e-mail message.

10. A computer implemented system for managing message communications, comprising:
an interface coupled to a communication network and operable to receive an electronic message;
wherein the electronic message is associated with a first communication platform; and
at least one processor coupled to the interface and operable to:
detect that the electronic message comprises a plurality of intended recipients;
automatically initiate an electronic forum for response communications associated with the electronic message;
wherein the electronic forum is associated with a second communication platform and comprises an interface for intended recipients to asynchronously view the response communications associated with the electronic message;
detect the response communications associated with the electronic message; and
post the response communications to the electronic forum;
wherein the processor is further operable to:
detect message replies to the electronic message, wherein the message replies are associated with the first communication platform;
determine that an amount of the message replies exceeds a message reply threshold; and
based on the determination that an amount of the message replies exceeds a message reply threshold, automatically initiate the electronic forum for response communications associated with the electronic message.

11. The system of claim 10, wherein the processor is further operable to post the message replies to the electronic forum.

12. The system of claim 8, wherein the electronic forum comprises a web page.

13. The system of claim 12, wherein the processor is further operable to communicate an address of the web page to one or more of the intended recipients.

14. The system of claim 8, wherein the processor is further operable to:
detect message replies to the electronic message, the message replies comprising intended reply recipients;
block the message replies from communication to the intended reply recipients; and
post the message replies to the electronic forum.

15. A computer readable device comprising code, the code which when executed by a processor is operable to:

receive an electronic message;
wherein the electronic message is associated with a first communication platform;
detect that the electronic message comprises a number of intended recipients;
in response to detecting that the number of intended recipients is larger than a threshold, automatically initiating an electronic forum for response communications associated with the electronic message;
wherein the electronic forum is associated with a second communication platform and comprises an interface for intended recipients to asynchronously view the response communications associated with the electronic message;
detect the response communications associated with the electronic message; and
post the response communications to the electronic forum.

16. The medium of claim 15, wherein the electronic message comprises an e-mail message.

17. A computer readable device comprising code, the code which when executed by a processor is operable to:
receive an electronic message;
wherein the electronic message is associated with a first communication platform;
detect that the electronic message comprises a plurality of intended recipients;
automatically initiate an electronic forum for response communications associated with the electronic message;
wherein the electronic forum is associated with a second communication platform and comprises an interface for intended recipients to asynchronously view the response communications associated with the electronic message;
detect the response communications associated with the electronic message; and
post the response communications to the electronic forum;
wherein the code is further operable to:
detect message replies to the electronic message, wherein the message replies are associated with the first communication platform;
determine that an amount of the message replies exceeds a message reply threshold; and
based on the determination that an amount of the message replies exceeds a message reply threshold, automatically initiate the electronic forum for response communications associated with the electronic message.

18. The medium of claim 17, wherein the code is further operable to post the message replies to the electronic forum.

19. The medium of claim 15, wherein the electronic forum comprises a web page.

20. The medium of claim 19, wherein the code is further operable to communicate an address of the web page to one or more of the intended recipients.

21. The medium of claim 15, wherein the code is further operable to:
detect message replies to the electronic message, the message replies comprising intended reply recipients;
block the message replies from communication to the intended reply recipients; and
post the message replies to the electronic forum.

22. A system for managing message communications, comprising:
means for receiving an electronic message;
wherein the electronic message is associated with a first communication platform;
means for detecting that the electronic message comprises a number of intended recipients;
means for automatically initiating an electronic forum for response communications associated with the electronic message in response to detecting that the number of intended recipients is larger than a threshold;
wherein the electronic forum is associated with a second communication platform and comprises an interface for intended recipients to asynchronously view the response communications associated with the electronic message;
means for detecting the response communications associated with the electronic message; and
means for posting the response communications to the electronic forum.

23. The method of claim 1, wherein one or more of the response communications remain displayed after new response communications are posted.

* * * * *